Jan. 3, 1967 W. L. HIATT 3,295,490
PROPULSION MEANS
Filed May 6, 1963 5 Sheets-Sheet 1

WILBUR L. HIATT
INVENTOR

BY Robert A. Spray
ATTORNEY

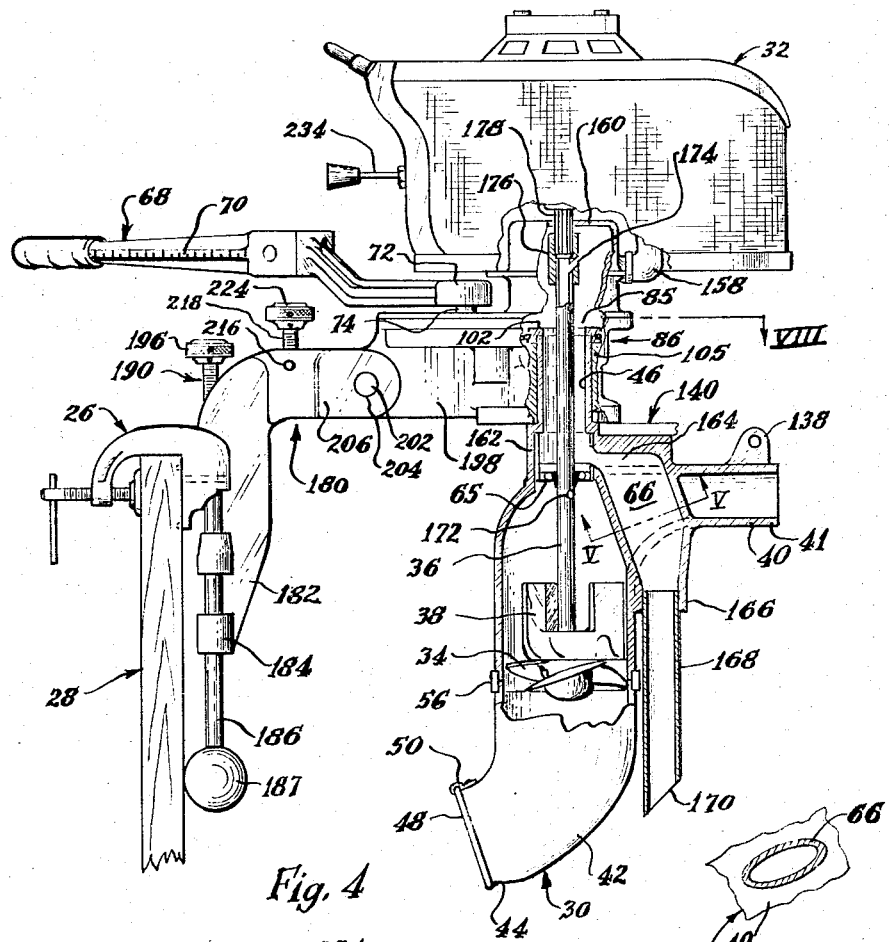
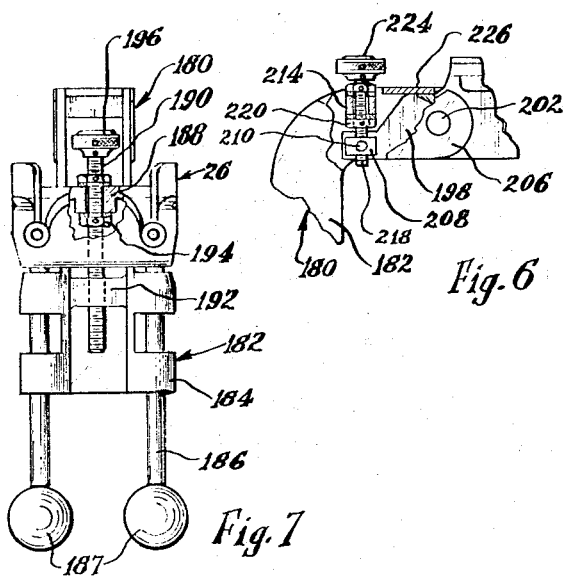
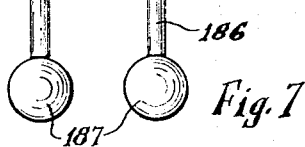

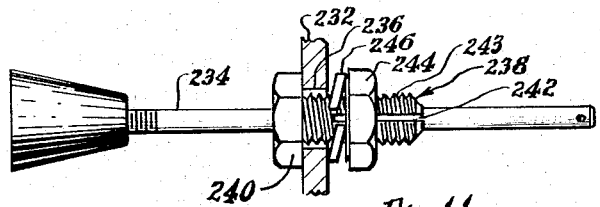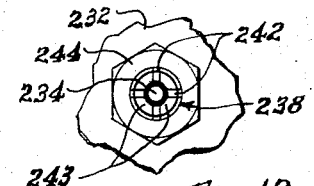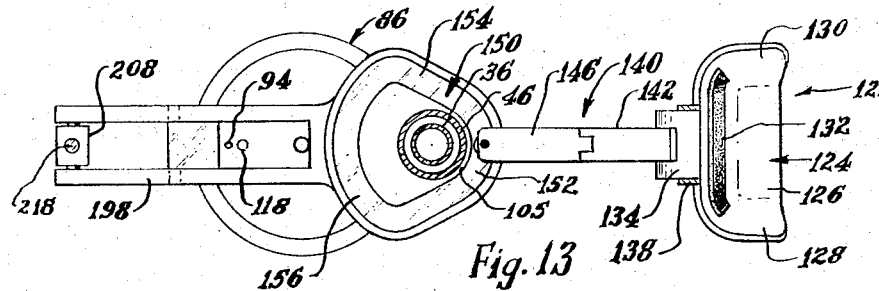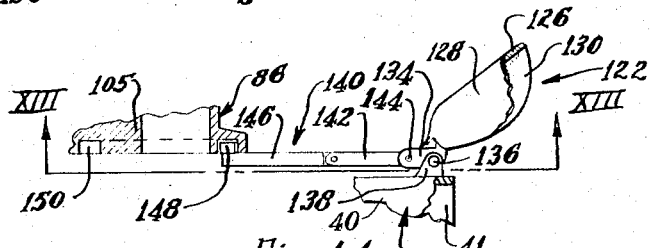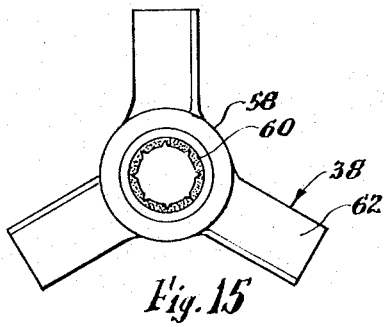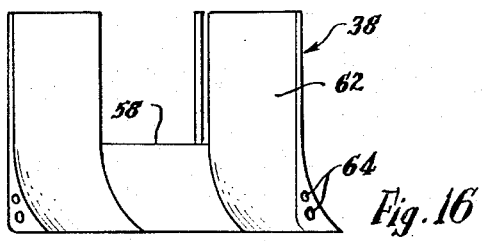

Jan. 3, 1967  W. L. HIATT  3,295,490

PROPULSION MEANS

Filed May 6, 1963  5 Sheets-Sheet 5

WILBUR L. HIATT
INVENTOR

BY Robert A. Spray
ATTORNEY

United States Patent Office 3,295,490
Patented Jan. 3, 1967

3,295,490
PROPULSION MEANS
Wilbur L. Hiatt, 561 E. 37th St.,
Indianapolis, Ind. 46202
Filed May 6, 1963, Ser. No. 278,318
4 Claims. (Cl. 115—12)

This invention relates to propulsion means, and more particularly, in the form of the invention here illustrated, relates to a boat-propulsion equipment utilizing reaction-type drive-means, referred to as a jet pump or jet motor, in which forward propulsion of the vehicle is achieved by projection of water rearwardly from the vehicle above the water-line.

The overall and general objects of this invention is to provide a novel and improved propulsion means of reaction or jet type having advantages of construction and operation.

As is shown in the accompanying drawings and in this description, several features and concepts contribute and combine to provide the several advantages of construction and operation, adding to the desirability of the equipment. Accordingly, the features, objects, concepts and advantages will be explained and apparent from the following description of an illustrative embodiment of the invention, reference being had to the accompanying somewhat diagrammatic drawings, in which:

FIG. 4 is a side view, partially in section, of the propulsion means in FIG. 1;

FIG. 5 is a fragmental sectional view, taken along section-line V—V of FIG. 4;

FIG. 6 is a fragmental detail, partially in section, illustrating tilt-adjustment means of the device shown in FIG. 4;

FIG. 7 is a fragmental detail, partially in section, illustrating height-adjustment means of the device shown in FIG. 4;

FIG. 11 is an enlarged detail view illustrating means for regulating operation of a control rod, such as is illustrated in FIGS. 1 and 4;

FIG. 12 is an end view of the details illustrated in FIG. 11;

FIG. 13 is a detail view showing the bottom of the features shown in FIG. 9, and along view-line XIII—XIII of FIG. 14, illustrating means controlling the direction of water projected from the propulsion means;

FIG. 14 is a side elevational view, partially in section, of the water-controlling features illustrated in FIG. 13;

FIG. 15 is a top view of a stationary vaned member adjacent the lower end of the drive shaft, as shown in FIG. 4;

FIG. 16 is a side view of the vaned member shown in FIG. 4;

Figure 1:
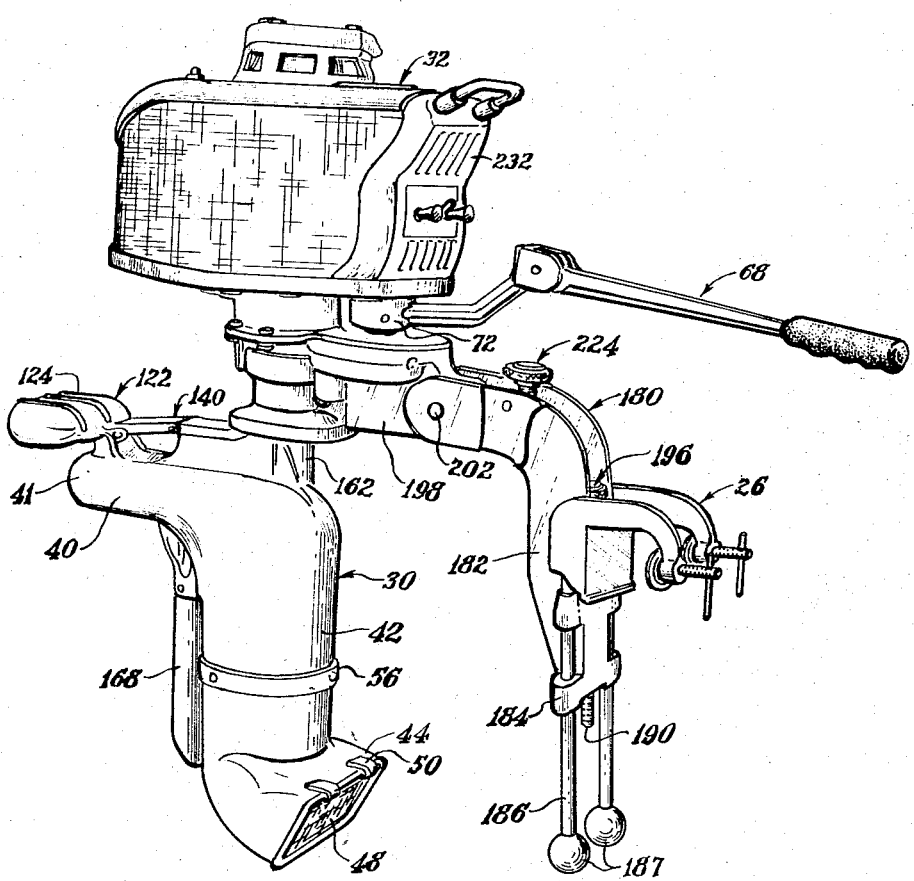
FIG. 1 is a pictorial view showing a propulsion means according to an illustrative embodiment of the invention.

As shown in the drawings, the illustrated embodiment shows a reaction or jet-motor type of propulsion means, and is illustrated (FIG. 4) as clamped by a clamp means 26 upon the transom 28 of a boat. Both views of the general assembly (FIGS. 1 and 4) illustrate the propulsion means in a position to project water rearwardly, thus to drive the associated boat forwardly.

The overall propulsion means will, for ease of understanding, be described with reference to its several operational functions. Also for ease of understanding, although in several respects those operational functions overlap and utilize structural and operational co-operation, they will generally be described separately.

These operational functions include: (A) Water propulsion system; (B) Steering; (C) Reverse features, and related features; (D) Exhaust system; (E) Cooling; (F) Height adjustment; (G) Tilt adjustment; (H) Baffling; (I) Control rod operation; and (J) Service pump operativity.

A. WATER-PROPULSION SYSTEM

General features of the water-propulsion system include a water tube 30, and engine 32, an impeller 34 driven by a drive shaft 36 extending from the engine 32, and a vaned member 38 disposed in the water tube 30 adjacent the impeller 34. These components, as well as others of the water-propulsion system will now be described more specifically.

As shown, the water tube 30 is in the general form of an inverted L, having a horizontal leg 40 having a discharge outlet 41 and a vertical leg 42, the lower portion of the leg 42 being turned horizontally to provide a water inlet snout 44. The water tube 30 is shown as provided by a casting having a cylindrical upward extension 46 axially in line with the vertical tube-leg 42, this extension 46 providing means for supporting the water-tube 30, and for co-operating to provide other functions such as cooling, steering, and exhaust, as explained in other sections of this description. Extension 46 is coaxial with drive-shaft 36.

A screen 48 is provided to cover the inlet snout 44, the screen being rotatably carried by straps 50 connected to the snout 44 of water tube 30, providing that the screen may be raised upwardly to a non-operative position in clear water for greater efficiency.

Figure 18:
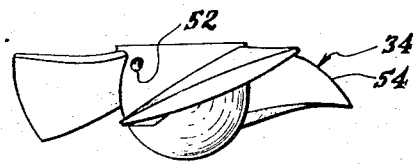
FIG. 18 is a side view of the impeller shown in FIG. 18.

Water is drawn through snout 44 and upwardly into vertical leg 42 of water tube 30 by the impeller 34, the impeller revolving on the the vertical axis of drive-shaft 36 to which it is keyed by suitable screw means (not shown) passing through an opening 52 (FIG. 18) of the impeller. The vanes or blades 54 of the impeller 34 revolve in a general horizontal plane, parallel to the surface of the water, and the blades are formed to have an air-foil cross-section.

The lower portion of the water-tube leg 42, and the snout 44, are provided as a member separate from the upper portions of the water tube 30, providing convenient access to the impeller 34. A band 56 supports those portions on the water tube 30.

Immediately above the impeller is the vaned member or spider 38 (FIGS. 15 and 16) having a central hub 58 having a bearing 60 supporting the lower end of drive-shaft 36 passing therethrough.

The vanes 62 of member 38 are generally vertical to exert a straightening effect on the water being forced through water tube 30, except at their lower end the vanes 62 are curved to generally smoothly cam or turn the water to a direction axially of the tube 30. The straightening effect avoids a throttling effect of swirling water passing the bend between legs 40 and 42 of the tube 30.

Mounting holes 64 are provided in the periphery of spider member 38 for securing the member 60 inside the tube 30. As shown in FIG. 4, the spider member 38 is positioned closely adjacent the upper portion of impeller 34, thus achieving by the co-operation of those members a shearing action on weeds or the like which may be drawn into the water tube 30.

The upper portion of vertical tube leg 42 is provided with a seal 65 through which the drive-shaft 36 passes.

It will be also noted in FIGS. 1, 4, 19, and 20 that throat cross-sections of various portions of the overall water-tube 30 are approximately the same effective area, considering flow-head loss in the screen, the two bends, the effect of the impeller and spider-member, and an exhaust-tube 66 crossing through water tube leg 40, that tube 66 being more fully explained in the section of this description relating to the exhaust operational function.

B. STEERING AND RELATED FEATURES

Steering of the boat is achieved in the illustrated embodiment by a tiller-arm 68 which, through mechanism now to be described, is effective to rotate water tube 30 about the axis of drive shaft 36, to project the water stream out the discharge outlet 41 in the desired direction to obtain the reaction propulsion of the boat in the desired direction.

The tiller-arm 68, which is shown in FIG. 4 as provided with suitable calibrations 70 providing a convenient scale for measuring fish-size, is connected through a coupling sleeve 72 to a vertically-extending control shaft 74.

Figure 8:
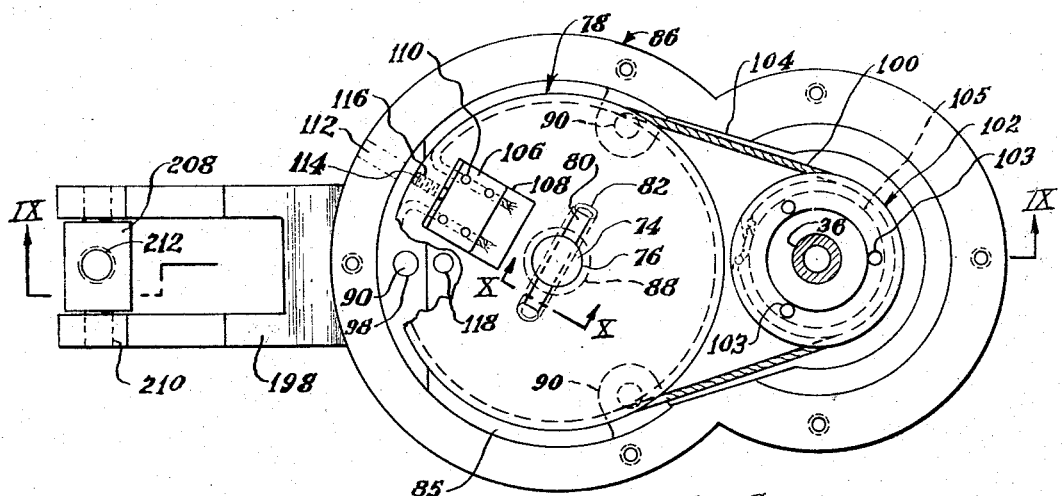
FIG. 8 is a sectional view taken generally along section-line VIII of FIG. 4, substantially enlarged, illustrating steering features.
Figure 9:
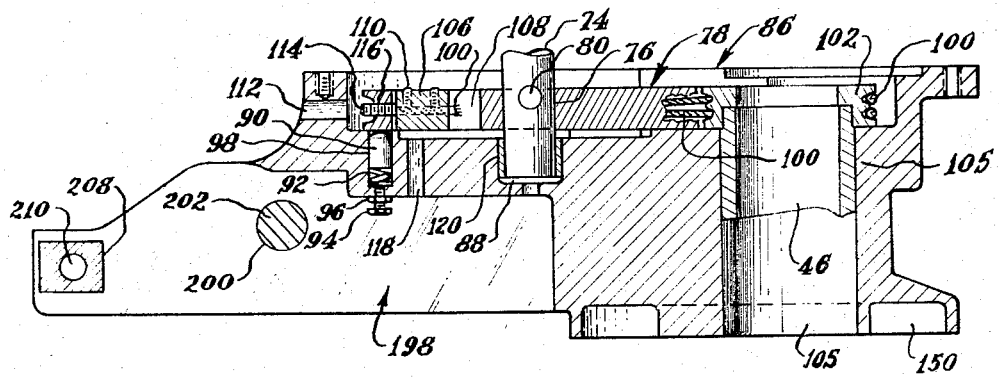
FIG. 9 is a sectional view taken generally along section line IX—IX of FIG. 8.
Figure 10:
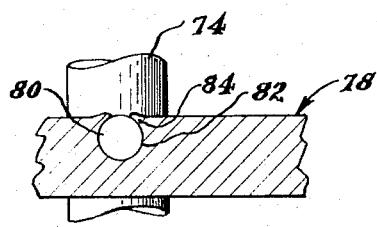
FIG. 10 is a detail view taken generally along view-line X—X of FIG. 8.
Figure 20:
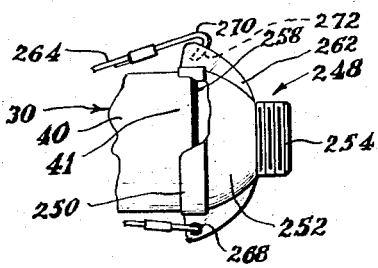
FIG. 20 is a fragmental top view of the converter means illustrated in FIG. 19.
Figure 19:
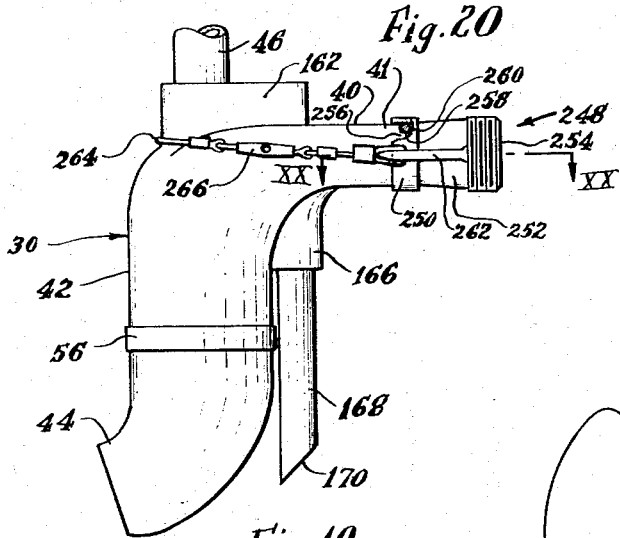
FIG. 19 is a side elevational view of a portion of the propulsion means of FIG. 4, provided with a converter means for utilizing the propulsion means in a pumping operation.
Figure 17:
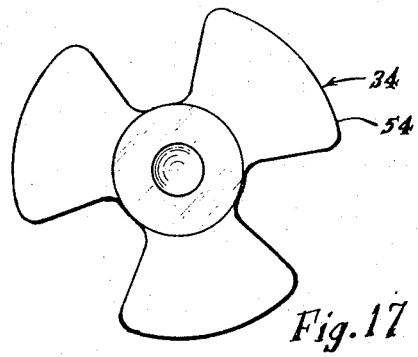
FIG. 17 is a top view of the impeller shown in FIG. 4.

Viewing the steering features now in the enlarged detail views of FIGS. 8, 9, and 10, it will be noted that the shaft 74 passes through a central opening 76 in a driver pulley 78, and is connected by a pin 80 to driver pulley 78. That connection is shown as advantageously provided by the provision of a groove 82 in a face of pulley 78, with the edges of the pulley adjacent groove 82 being peened over, as illustrated in FIG. 10 by numeral 84, after the control shaft 74 has been passed through pulley-hole 76 and the pin 80 seated in groove 82.

The pulley 78 is disposed in the hollow interior 85 of a casing member 86, the control shaft 74 being rotatably received in a recess 88 in casing 86.

One or more torque-pins 90 are carried by casing 86, frictionally engaging a face of pulley 78 to retain movement of the pulley 78, achieving steadiness of boat-direction and control. The pins 90 are spring-pressed toward pulley 78 by compression springs 92; and the force of each spring 92 is regulated by a set screw 94 which threadedly extends through the casing 86, the setting of screw 94 being held by a jam nut 96. The pins 90 are shown as extending vertically, each being disposed in a recess 98 in casing 86.

A pulley cable 100 operatively extends between pulley 78 and a driven pulley 102 which is shown as fixed by screws 103 (FIG. 8) to the top of the cylindrical extension 46 of water-tube 30. For accommodating the run of cable 100, the middle portion of the hollow interior 85 of the casing 86, which is generally of a figure-eight configuration for receiving the pulleys 78 and 102, is shown as flared outwardly at 104. In the embodiment here illustrated, the bearing of driven pulley 102 on the bottom surface of the casing-chamber 85 supports the water-tube 30 vertically; and the bore 86, through which water tube bearing-cylinder 46 extends, supports water-tube 30 for rotation.

Accordingly, the steering effort imparted through tiller-arm 68 is transmitted via driving pulley 78 and driven pulley 102 to the water-tube 30, thus controlling the direction of water discharged through outlet 41 of water-tube 30 to control the direction of boat movement.

Pulley-cable 100 is shown in FIGS. 8 and 9 as connected to driver pulley 78 through a movable block 106 slidably received in a radially-extending recess 108 provided in driver pulley 78. Set screws 110 are shown as holding the ends of cable 100 to the movable block 106. An access opening 112 is shown as extending through the casing 86 in the plane of driver pulley 78 and its cable block 106, permitting convenient adjustment of the tension of cable 100, an adjustment screw 114 being provided in a threaded radial screw-hole 116 extending completely through the pulley 78 from its periphery to its block-recess 108. Accordingly, to adjust the tension, the user first turns the tiller arm 68 to cause driver pulley 78 to register its screw-hole 116 with the access-opening 112; then he inserts his screw driver through access-opening 112, and rotates the adjustment screw 114 to cause it to push the block 106 inwardly, imparting more tension on the cable 100 as may be desired.

A vent passage 118 extends down from the bottom of casing chamber 85 outwardly through the casing 86, and casing recess 88 is also vented downwardly through the casing.

Suitable sleeves and bushings, such as sleeve 120 which is provided about control shaft 74 inside recess 88, may be provided as desired.

C. REVERSE FEATURES AND RELATED FEATURES

With the propulsion means positioned as in FIGS. 1 and 4, water is discharged from outlet 41 of water-tube 30 in a stream which is generally horizontal, depending upon tilt adjustment, to be described hereinafter, providing good thrust efficiency. This generally horizontal nature of the discharge stream is maintained even when the propulsion means is rotated in boat-turning; for the discharge outlet 41 as a part of water-tube 30, rotates about the vertical axis of the cylindrical tube-extension 46.

However, water-deflector means 122 are provided (FIGS. 1, 13, and 14) which automatically baffle or deflect the stream downwardly as the propulsion means is turned to project the discharge stream forwardly to achieve reverse or astern movement of the boat. This prevents the discharge stream from being projected directly at the boat or its occupants.

Accordingly, in the deflector means 122 shown, there is provided a deflector member 124 having a curved upper wall 126 and side walls 128 and 130 depending from the upper wall, the width and length of the upper wall 126 being such as to provide that the deflector 124 is somewhat larger than discharge outlet 41. A resilient strip 132 is affixed to the interior surface of upper wall 126, the strip 132 advantageously and economically preventing leakage or squirting of the discharge stream, and preventing rattling by providing cushioned contact of the deflector 124 and discharge outlet 41 when the deflector is substantially closed.

The deflector 124 is shown as supported by arms 134, a central portion of which is pinned as by pin 136 to a boss means 138 provided on the upper surface of outlet portion 41 of water-tube 30.

Automatic means for moving the deflector 124 are shown as comprising a linkage 140, which is slidably supported on the horizontal leg 40 of water-tube 30. In the linkage 140, an outer link 142 is pinned as by pin 144 to the deflector-arms 134 inwardly of pin 136; and an inner link 146 is provided on its inner end with a cam-follower in the form of a roller 148.

This roller 148 rides in a camway 150 (FIG. 9, as well as FIGS. 13 and 14) which opens downwardly in casing member 86. Portions 152 of camway 150 adjacent the water deflector means 122, and extending for about ninety degrees to each side of outer dead center, are concentric with the axis of the water-tube cylindrical bearing-member 46; and this, together with the length of linkage 140, co-operate to provide that when the water-tube 30 is co-turned to project the discharge stream from outlet 41 rearwardly (for boat motion forwardly) the deflector 124 will be withdrawn upwardly to a retracted position permitting unrestricted discharge.

However, from that concentric portion, the camway 150 flares smoothly outwardly at 154, providing that for approximately forty-five degrees on either side of inner dead center, the camway is at a greater distance, from the axis of cylindrical bearing 46, throughout portion 156; and thus the deflector 124 will be held in a lowered position over discharge outlet 41, deflecting the discharge stream downwardly as desired, avoiding the projecting of the discharge stream on the boat or its occupants, when the motor is turned forwardly for reverse boat-movement.

D. EXHAUST SYSTEM

The exhaust gases from the engine 32 flow out of the motor-head through an exhaust manifold 158 (see FIG. 4) into a cylindrical housing 160 atop casing 86, the housing being shown as generally cylindrical in form and co-axial with drive shaft 36. The exhaust gases then pass downwardly between the exterior surface of drive shaft 36 and the hollow interior of drive pulley 102 (see FIGS. 4, 8, and 9) and along the hollow interior of the cylindrical bearing-member 46 of water-tube 30.

The upper portion 162 of water-tube 30, below the cylindrical extension 46, is hollow, and the exhaust gases flow downwardly thereinto. (It is this upper portion 162 of water-tube 30 which seats upwardly against the bottom of casing 86.) Above the seal 65, the exhaust gases flow through a passage 164 along a portion of the horizontal leg 40 of water-tube 30, and then enter an exhaust tube 66 (see FIGS. 4 and 5) which crosses through the water-tube leg 40. This duct 66 is of streamlined configuration in the general form of a narrow ellipse, the major axis of which extends parallel to the tube-leg 40. Beneath the tube-leg 40, the tube 66 extends downwardly and terminates in a cylindrical terminal portion 166, into which is fitted a cylindrical exhaust tube 168 which extends downwardly along water-tube leg 42. Exhaust tube 168, at its lower end, is shown as cut on a slant to provide that the exhaust opens in a direction opposite to that of the opening of water-tube snout 44, as well as opening downwardly.

Summarizing the exhaust route then, the flow of exhaust gases is through members 158, 160, 102, 46, 164, 66, and 168.

E. COOLING

Cooling is advantageously achieved in the illustrative embodiment by providing that the drive shaft 36 has a hollow bore, holes 172 (see FIG. 4) being provided in drive shaft 36 below the seal 65, the hole 172 communicating the water under pressure in water-tube 30 with the hollow bore of drive shaft 36.

This water in the bore of drive shaft 36 is forced by the effect of impeller 34 to flow upwardly along the bore of shaft 36 to the region of the housing 160 into which the exhaust gases flow. Within the region of housing 160 the drive shaft 36 is provided with an outlet opening 174, which, as shown, extends from the bore of shaft 36 in a direction upwardly and radially outwardly. This outlet 174 is shown as extending both through the wall of drive shaft 36 and a coupling sleeve 176 which couples drive shaft 36 to the power take-off shaft 178 of the engine 32.

Water emerging through outlet 174, the drive shaft 36 of course revolving at a rapid rate, enters the housing 160 in the form of a conical and rapidly moving curtain or sheet of water, achieving substantial cooling of the chamber 160. The location and direction of outlet 174 is such that the above-mentioned sheet of coolant water strikes the housing 160 at a relatively high region thereof, adding to the overall cooling effect.

Most of this coolant water is then carried away with the exhaust gases, by the route described in the section of this description relating to exhaust. Any of this coolant water which runs laterally in the hollow interior 85 of casing 86 is discharged through the vent passage 118.

F. HEIGHT ADJUSTMENT

As indicated above, the propulsion means is clamped to the boat transom 28 by a clamp means 26. Without disturbing the relationship of clamp 26 and transom 28, the propulsion means is provided with a height adjustment now to be described, accommodating differences in boat configuration, draft, and for other reasons of the boat operation.

Accordingly, the height adjustment (see FIGS. 1, 4, and 7) is provided by means permitting selective relative movement of a mounting bracket 180 (which supports the overall device) and the clamp means 26. The bracket 180 is shown of the general shape of an inverted L, the vertical leg 182 of which is provided along each side with a pair of vertically displaced bosses 184 which are bored with co-axial cylindrical openings; and each pair of the bosses 184 receives one of a pair of guide rods 186 which extend vertically downward from the clamp means 26. Rods 186 are shown of cylindrical shape; and rods 186 carry at their lower ends a spacing means here shown as a ball 187, which engages the boat transom 28, holding the rods 186 generally parallel to the boat transom 28 but in spaced relationship thereto to permit the desired movement of bracket-bosses 184.

The clamp 26 is provided, on its side adjacent the bracket 180 with an outwardly-extending boss 188 which is provided with an outwardly-extending cylindrical bore to loosely accommodate a threaded adjustment screw 190, the lower portion of the screw 190 threadedly engaging an aligned vertically-extending threaded hole in a boss 192 in the bracket 180. Nuts 194 are shown set-screwed to height-adjustment screw 190 to provide that it does not move axially with respect to clamp-boss 188, and a large manipulating head 196 is provided at the top end of screw 190 for adjusting the setting of screw 190.

Accordingly, rotation of the height-adjustment screw 190 alters the spacing between the boss 188 of clamp 26 and the boss 192 of bracket 180, the bracket bosses 184 sliding along guide rods 186, providing height adjustment as desired. Height adjustment may be thus achieved quite conveniently, even when the boat is moving in the water and the engine is running.

G. TILT ADJUSTMENT MEANS

Means will now be described which provide for convenient adjustment of the tilt of the propulsion means with respect to the boat transom 28, whereby the tilt may be quickly and conveniently adjusted even while the boat is moving in the water and the engine is running. Accordingly (see FIGS. 6 and 9), the clamp member 86 is provided with arms 198 which extend toward the mounting bracket 180 with an adjustable connection thereto, now to be described. The casing arms 198 are provided with laterally aligned holes 200 which receive a pin 202 which extends through the holes 200 and also through holes 204 provided in the adjacent end of a horizontal leg 206 of the L-shaped mounting bracket 180, the mounting bracket 180 and the casing 86 thus being rotatably connected by pin 202.

Co-operating with the rotational mounting (by pin 202) just described, the terminal portion of the casing arms 198 is provided with a swivel block 208 (FIGS. 6, 8, and 9), pinned as by pins 210 to the casing arms 198. This block 208, which swivels on the lateral and horizontal axis of pins 210, is provided with a vertical and threaded hole 212. Above the block 208 there is similarly provided a swivel block 214 on the horizontal leg 206 of mounting bracket 180. This block 214 is rotatably pinned to leg 206 of bracket 180 by pins 216, and is provided with a vertical hole which loosely receives a tilt-adjustment screw 218.

Nuts 220 are shown set-screwed to tilt-adjustment screw 218 to provide that it does not move axially with respect to swivel block 214 on mounting bracket 180; and a large manipulating head 224 is provided at the top end of screw 218 for adjusting the setting of screw 218. A horizontal web 226 on mounting bracket 180, between the swivel block 214 and the bracket holes 204, interconnects the side pieces of bracket 180 and provides an abutment limiting upward swinging of the casing arms 198.

Accordingly, tilt-adjustment is readily and conveniently achieved, even when the boat is moving in the water and the engine is running, by rotating the tilt-adjustment screw-head 224, obtaining the desired tilt-adjustment by the desired spacing of swivel block 214 on bracket 180 and swivel block 208 on casing arms 198.

H. BAFFLING

Figures 2, 3:
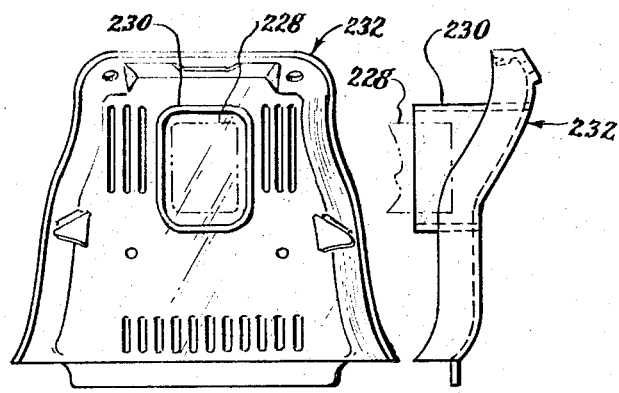
FIG. 2 is an elevational view of a front plate of the power head of the propulsion means of FIG. 1.
FIG. 3 is a side elevational view of the front plate shown in FIG. 2.

An advantageous baffling of the carburetor 228 (FIGS. 2 and 3) of engine 32 is provided by a jacket 230. This jacket 230, shown of a generally rectangular shape, extends rearwardly from the control panel or dash which forms a front plate 232 of the housing structure of engine 32, to loosely surround the front portion of the engine carburetor 228, the carburetor being schematically illustrated in FIGS. 2 and 3. This baffling aids in reducing noise from the carburetor, and provides a degree of covering and protection for the engine carburetor.

I. CONTROL ROD OPERATION

Control rods such as a choke or carburetor control rod 234 (see FIGS. 4, 11, and 12) which pass through the front plate 232 of engine 32 are provided with advantageous frictional means, as illustrated in FIGS. 11 and 12, to cause them to retain a certain selected setting until re-adjusted by the boat-operator. Accordingly, the front plate 232 is provided with an access opening 236 through which a control screw 238 is passed, the screw 238 as shown in FIGS. 11 and 12 having a cap 240 on its outer end which seats forwardly against the front plate 232.

The control screw is bored to receive the control rod 234; and slots 242 are cut into screw 238 for a depth extending at least substantially the entire span of screw 238 inwardly of front plate 232, those inner screw-portions 243 between the slots 242 thus being of a finger-like nature. A nut 244, desirably with a suitable lock-washer 246, is provided for screwing onto the inner end of screw 238. The slotting of screw 238 in this embodiment (at 242) and the angular profile of the threads of screw 238 combine to provide that, as the nut 244 is tightened, the inner portions 243 of screw 238 will be cammed inwardly, whereupon they resiliently deflect inwardly to frictionally engage control rod 234. The tightness of nut 244 should be so adjusted by the user that the control rod 234 will retain any setting although of course not so tight that the control rod 234 can not be moved when desired.

J. SERVICE PUMP OPERATIVITY

Further concepts now to be described provide means whereby the propulsion means may provide an advantageous water pump, utilizing the water in tube 30 under pressure by the impeller 34.

Accordingly, there is provided (FIGS. 19 and 20) a coupling nipple 248 adapted to fit over discharge outlet 41, the nipple 248 in the illustrated embodiment being of generally rectangular cross-section at its inlet end 250 and smoothly tapering in its central or transition portion 252 to a threaded circular portion 254 at its discharge end.

The tube discharge outlet 41 of tube 30 is provided with a reduced end portion 256, adapted to receive sealing means such as O-ring 258 seated on outlet portion 256 and in back of a rearwardly-facing abutment 260 provided interiorly of nipple 248.

Side-flanges 262 are provided on nipple 248; and a chain 264 having a turnbuckle 266 is provided to pass around tube-head 162 and be attached to the nipple-flanges 262. As shown, one end of chain 264 is linked to nipple 248 by passing through a hole 268 in one of the flanges 262; and the other end of chain 264 is provided with a hook 270 adapted to be received in a rearwardly-extending hole in one of the flanges 262.

Accordingly, it will thus be seen from the foregoing description of the invention according to this illustrative embodiment, considered with the accompanying drawings, that the present invention provides a new and useful propulsion means, having desired advantages and characteristics, and accomplishing its intended objects, including those hereinbefore pointed out and others which are inherent in the invention.

It will be understood that modifications and variations may be effected without departing from the scope of the novel concepts of the present invention; accordingly, my invention is not limited to the specific form or arrangement of parts herein described or shown.

Moreover, terms and expressions of the description and claims are to be broadly construed. For example, the terms "vertical" and "horizontal" are to be interpreted in the general sense, particularly considering the fact that the propulsion means is provided with tilt-adjustment means; expressions such as "toward" or "facing" the boat refer to the general direction of the boat.

I claim as my invention:
1. A propulsion means for boats, comprising:
   a frame-member;
   water-flow means including a discharge outlet for discharging through said outlet water under pressure to achieve propulsion by reaction effect;
   the said water-flow means being movable to vary the direction which said outlet faces to thereby guide the boat;
   the outlet facing in a generally horizontal direction to project the stream of water discharged therethrough in a generally horizontal direction;
   and deflector means to deflect the stream of water discharged through said outlet downwardly as the water-flow means is in a direction in which the said outlet is facing the said boat;
   the said water-flow means being movable relative to said frame member to vary the direction which said outlet faces;
   cam means co-operating between said frame member and said deflector means to automatically cam said deflector means to a deflecting position with respect to said outlet when said water-flow outlet is in a boat-facing direction.

2. A propulsion means for boats, comprising:
   a frame-member;
   water-flow means including a discharge outlet for discharging through said outlet water under pressure to achieve propulsion by reaction effect;
   the said water-flow means being movable to vary the direction which said outlet faces to thereby guide the boat;
   the outlet facing in a generally horizontal direction to project the stream of water discharged therethrough in a generally horizontal direction;
   and deflector means to deflect the stream of water discharged through said outlet downwardly as the water-flow means is in a direction in which the said outlet is facing the said boat;
   the said water-flow means being movable relative to said frame member to vary the direction which said outlet faces;
   and actuating means co-operating between said frame member and said deflector means to automatically operate said deflector means in response to relative position of said water-flow means and said frame member.

3. A propulsion means for boats, comprising:
water-flow means for discharging water under pressure to achieve propulsion;
pressure means for said water-flow means;
a drive shaft for energizing said pressure means;
combustion means for energizing said drive shaft;
the drive shaft provided with a hollow core;
the said drive shaft also provided with an opening, in a region of pressure in said water-flow means, communicating the said core with water under pressure in said water-flow means;
means providing an outlet from said drive shaft core operatively adjacent the said combustion means, to deliver water under pressure to cool said combustion means.

4. A propulsion means for boats, comprising:
water-flow means for discharging water under pressure to achieve propulsion;
pressure means for said water-flow means;
a drive shaft for energizing said pressure means;
the drive shaft provided with a hollow core;
the said drive shaft also provided with an opening, in a region of pressure in said water-flow means, communicating the said core with water under pressure in said water-flow means;
means providing an outlet from said drive shaft core at a location along said drive shaft spaced from said opening.

References Cited by the Examiner
UNITED STATES PATENTS

| | | | |
|---|---|---|---|
| 2,276,193 | 3/1942 | Hanley | 115—14 |
| 2,454,590 | 11/1948 | Berlinger | 188—83 |
| 2,716,960 | 9/1955 | McCumber | 115—41 |
| 2,807,173 | 9/1957 | Klass | 74—503 |
| 2,846,896 | 8/1958 | Allen | 114—172 X |
| 2,963,918 | 12/1960 | Blakstad | 74—242.8 |
| 2,971,507 | 2/1961 | Kiekhaefer | 123—198 |
| 2,972,328 | 2/1961 | Hodgson | 115—41 |
| 3,035,409 | 5/1962 | Pifer | 115—16 X |
| 3,047,318 | 7/1962 | Berkshire | 287—52.08 |
| 3,090,346 | 5/1963 | Burgin | 115—12 |
| 3,105,353 | 10/1963 | Schulz | 112—12 X |
| 3,194,205 | 7/1965 | Mattson et al. | 115—12 |

FOREIGN PATENTS

| | | |
|---|---|---|
| 567,569 | 2/1945 | Great Britain. |
| 91,341 | 4/1958 | Norway. |

FERGUS S. MIDDLETON, *Primary Examiner.*

SAMUEL LEVINE, MILTON BUCHLER,
*Examiners.*

T. BLUMENSTOCK, T. M. BLIX,
*Assistant Examiners.*